US010218649B2

(12) United States Patent
Joo et al.

(10) Patent No.: US 10,218,649 B2
(45) Date of Patent: Feb. 26, 2019

(54) METHOD AND SYSTEM FOR PROVIDING MULTI-USER MESSENGER SERVICE

(71) Applicant: NAVER Business Platform Corp., Seongnam-Si, Gyeonggi-Do (KR)

(72) Inventors: Beuprin Joo, Seongnam-si (KR); Seulki Jeong, Seongnam-si (KR); Yoonji Bang, Seongnam-si (KR); Han-Nah Park, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 117 days.

(21) Appl. No.: 14/144,820

(22) Filed: Dec. 31, 2013

(65) Prior Publication Data
US 2014/0207882 A1   Jul. 24, 2014

(30) Foreign Application Priority Data
Jan. 22, 2013  (KR) .................. 10-2013-0006897

(51) Int. Cl.
G06F 15/16  (2006.01)
H04L 12/58  (2006.01)

(52) U.S. Cl.
CPC .............. H04L 51/04 (2013.01); H04L 51/02 (2013.01)

(58) Field of Classification Search
CPC ................................ H04L 51/04; H04L 51/02
USPC ........................................ 709/204, 205, 206
See application file for complete search history.

(56) References Cited

U.S. PATENT DOCUMENTS

| 7,603,413 | B1 * | 10/2009 | Herold | G06Q 10/10 |
| | | | | 455/466 |
| 9,031,216 | B1 * | 5/2015 | Kamvar | H04L 12/1827 |
| | | | | 379/202.01 |
| 2003/0097301 | A1 * | 5/2003 | Kageyama | G06F 17/30265 |
| | | | | 705/14.52 |
| 2003/0182391 | A1 * | 9/2003 | Leber | G06F 17/30864 |
| | | | | 709/217 |
| 2007/0016585 | A1 * | 1/2007 | Nickell | G06F 17/30864 |
| 2007/0174244 | A1 * | 7/2007 | Jones | G06F 17/3053 |
| 2007/0219901 | A1 * | 9/2007 | Garbow | G06Q 30/06 |
| | | | | 705/39 |

(Continued)

FOREIGN PATENT DOCUMENTS

JP   2003-099382 A   4/2003
JP   2005-107893 A   4/2005

(Continued)

OTHER PUBLICATIONS

Korean Office Action dated Apr. 19, 2017 issued in corresponding Korean Application No. 10-2013-0006897.

(Continued)

Primary Examiner — Karen C Tang
(74) Attorney, Agent, or Firm — Harness, Dickey & Pierce, P.L.C.

(57) ABSTRACT

A messenger service method is provided that includes determining whether a user has created information for activating a search in a communication session. The communication session may be between the user and at least one other participant. The method includes transmitting the created information and a message input by the user. The method includes receiving a search result. The received search result may be generated based on the message and the information.

23 Claims, 9 Drawing Sheets

(56) References Cited

U.S. PATENT DOCUMENTS

| | | | |
|---|---|---|---|
| 2008/0263458 A1* | 10/2008 | Altberg | H04L 12/66 715/757 |
| 2009/0006333 A1* | 1/2009 | Jones | G06Q 30/02 |
| 2009/0254417 A1* | 10/2009 | Beilby | G06N 3/004 706/45 |
| 2009/0276400 A1* | 11/2009 | Jaffer | G06Q 10/06 |
| 2009/0313115 A1* | 12/2009 | Konig | G06Q 30/02 705/14.45 |
| 2010/0114684 A1* | 5/2010 | Neged | G06F 17/30864 705/14.14 |
| 2010/0180217 A1* | 7/2010 | Li | H04L 12/1818 715/758 |
| 2010/0274796 A1* | 10/2010 | Beauregard | H04L 12/1822 707/769 |
| 2011/0151899 A1* | 6/2011 | Sanchez | H04L 67/02 455/466 |
| 2013/0167044 A1* | 6/2013 | Graves | H04M 3/5191 715/756 |
| 2014/0074951 A1* | 3/2014 | Misir | H04L 12/1827 709/206 |
| 2014/0136506 A1* | 5/2014 | Ratner | G06F 17/30864 707/706 |
| 2014/0255895 A1* | 9/2014 | Shaffer | G09B 7/02 434/350 |

FOREIGN PATENT DOCUMENTS

| | | |
|---|---|---|
| JP | 2007-534083 A | 11/2007 |
| JP | 2008-547113 A | 12/2008 |
| JP | 2010-517132 A | 5/2010 |
| JP | 2012-037920 A | 2/2012 |
| KR | 2006-0074750 A | 7/2006 |
| KR | 2009-0000855 A | 1/2009 |
| WO | WO-2012/164968 A1 | 12/2012 |

OTHER PUBLICATIONS

Japanese Office Action dated Apr. 25, 2017 issued in corresponding Japanese Application No. 2013-245178.

* cited by examiner

Q: I wonder about the name of "mapo tofu". Why is it "mapo tofu"?
A: There are three different stories (content).

More view on a chat window

Connect to a web

Share a current search result

Backward

Retry the same question

Inactivate a search chat

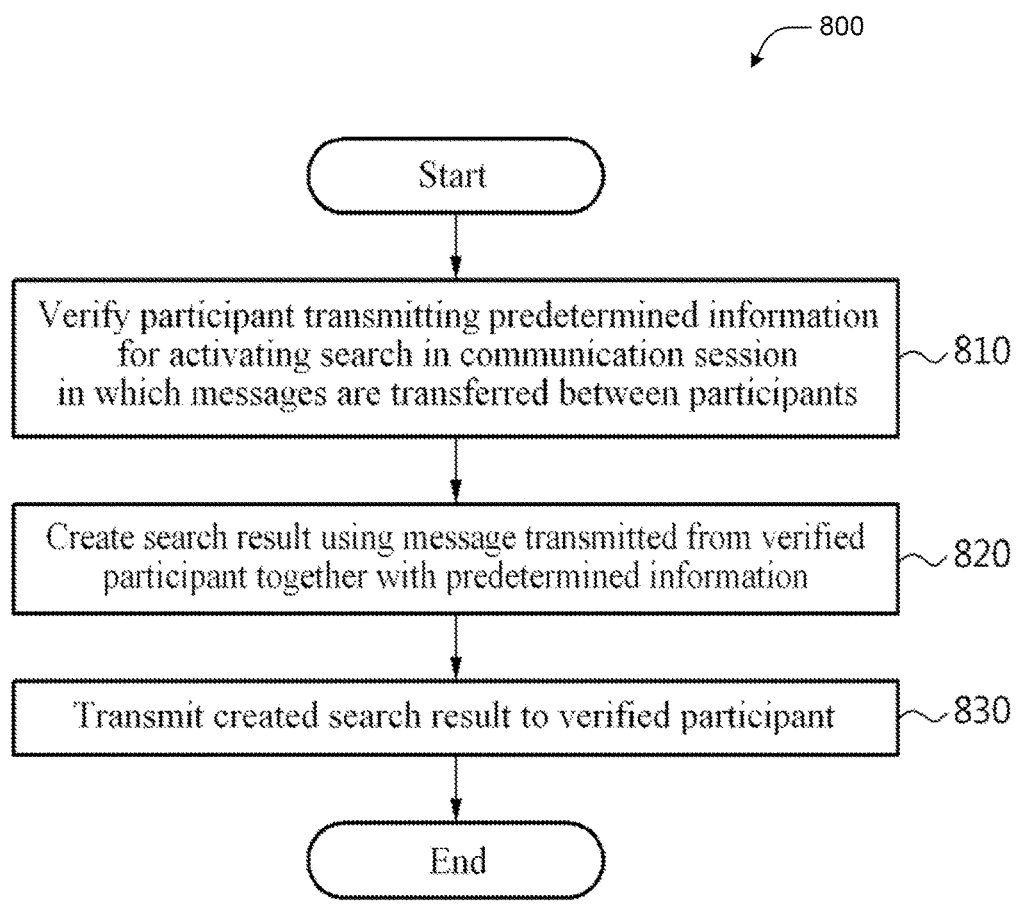

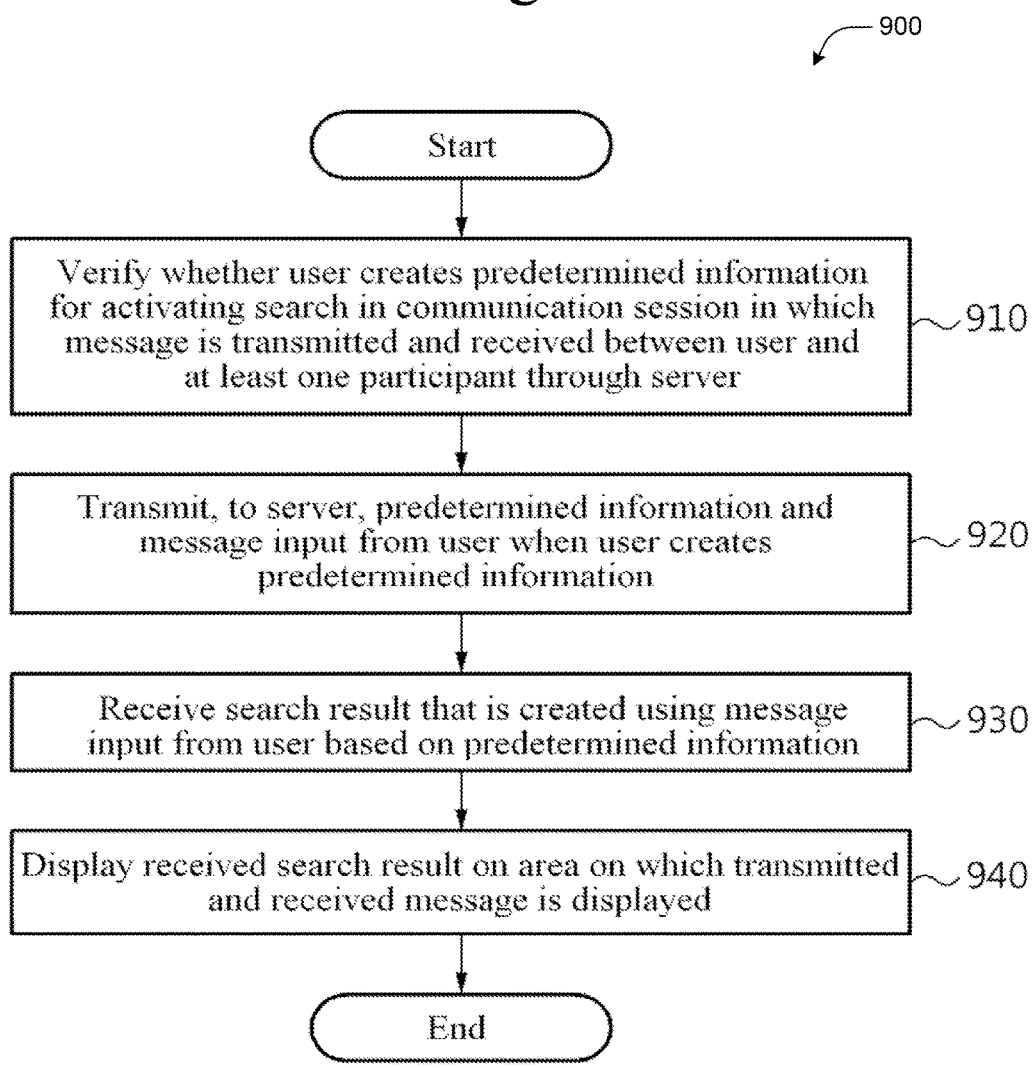

METHOD AND SYSTEM FOR PROVIDING MULTI-USER MESSENGER SERVICE

CROSS-REFERENCE TO RELATED APPLICATION

This application claims priority from and the benefit of Korean Patent Application No. 10-2013-0006897, filed on Jan. 22, 2013, which is hereby incorporated by reference in its entirety for all purposes as if fully set forth herein.

BACKGROUND

Field

Example embodiments relate to a method and/or system for providing a multi-user messenger service.

Description of the Background

A messenger application of a mobile terminal, such as a smartphone, may be performed using a translation robot configured to translate contents of conversations, a knowledge robot configured to perform an information search, and the like. However, only a one-to-one conversation, for example, a one-to-one chat between a single robot and a single user may be performed in the related art. For example, in the related art, a user may select a robot having a desired (or alternatively, predetermined) function, may create a chat room with the selected robot, and may perform only a one-to-one chat with the selected robot within the chat room.

Accordingly, in order to have a chat with a robot while a user is proceeding with a chat with another user in a created chat room, the user may need to leave the current chat room, select the robot, and then open a new chat room with the robot. Even though the chat room for chatting with the robot is already opened, the user may need to leave the current chat room in which the user is having a chat with the other user.

SUMMARY

According to an example embodiment a messenger service method is provided. The method includes determining whether a user has created information for activating a search in a communication session. The communication session may be between the user and at least one other participant. The method includes transmitting the created information and a message input by the user. The method includes receiving a search result. The received search result may be generated based on the message and the information.

Example embodiments provide that the method may further include displaying the received search result in an area corresponding to an area where the message is displayed.

Example embodiments provide that the at least one other participant includes a robot participant for simulating a human participant. The transmitting includes transmitting the information and the message to the robot participant.

Example embodiments provide that the message is classified as one of a general chat message and a search chat message, and the robot participant determines the classification based on the information.

Example embodiments provide that when the message is classified as the search chat, the search result is created by the robot participant and the robot participant provides the search result to the user.

Example embodiments provide that the information includes a marking. The marking may be obtained from the message.

Example embodiments provide that the information is created by at least one of an activation of a search chat and recognizing a motion.

Example embodiments provide that the motion is recognized in response to a user generated event. The user generated event may be an interaction with a display area of an input window.

Example embodiments provide that the user generated event may be generated by recognizing at least one of a contact, a double-touch, and a flicking occurring on the display area of the input window during a desired amount of time.

Example embodiments provide that the communication session may include a plurality of participants and the method may further include sharing the received search result with the at least one other participant of the communication session.

Example embodiments provide that the method may further include deleting the received search result including at least one search result displayed in a search session. The deleting may be in response to creating the information.

Example embodiments provide that the method may further include filtering the received search results by separating search results obtained from at least one expert of a desired class from search results obtained from a database.

According to an example embodiment a messenger service method is provided. The messenger service includes determining that a participant of a communication session has transmitted information for activating a search. The communication session includes the determined participant and at least one other participant, and at least one message that is transferred between the determined participant and the at least one other participant. The method includes creating a search result based on a message transmitted from the determined participant and the information. The method includes transmitting the created search result to the determined participant.

Example embodiments provide that the at least one of other participant includes a robot participant. The robot participant may simulate a human participant. The transmitting may include transferring the message and the information to the robot participant.

Example embodiments provide that the message is classified as one of a general chat and a search chat. The classification may be based on the information. The creating may include creating the search result through the robot participant when the message is classified into the search result.

Example embodiments provide that the information includes a marking. The marking may be obtained from the message.

Example embodiments provide that the information is created by at least one of activating a search chat by the determined participant and recognizing a motion of the determined participant.

Example embodiments provide the search result includes at least one of (i) an advertisement, the advertisement being retrieved using a keyword, the keyword including at least a portion of a text included in the message, (ii) information associated with a document, the document being retrieved using the keyword, and (iii) a question list including a plurality of questions, the question list being created using the keyword and a redefinition of the keyword.

Example embodiments provide that the plurality of questions is created for each one of a plurality of search databases. The question list may include a link to an answer list.

The answer list may include a list of at least one search result from each one of the plurality of search databases.

Example embodiments provide that the answer list may include a link to a document corresponding to the at least one search result.

Example embodiments provide a non-transitory computer-readable recording medium including program code that, when executed by a processor, implements the messenger service method.

According to an example embodiment, a messenger service server is provided. The server includes a processor configured to execute a participant verifier for determining that a participant of a communications session has transmitted information for activating a search in the communication session. The communication session may include the determined participant and at least one other participant, and at least one message that is transferred between the determined participant and the at least one other participant. The processor of the server includes a search result creator for creating a search result based on a message transmitted from the determined participant and the information. The processor of the server includes a search result transmitter for transmitting the created search result to the determined participant.

Example embodiments provide that the information may be created by at least one of activating a search chat of the determined participant and recognizing a motion of the determined participant.

According to an example embodiment, a messenger service system is provided. The system includes a processor configured to execute a file providing module for providing a file to a user device. The file may be used for installing the messenger application on the user device. The messenger application includes a verification unit for controlling the terminal to determine whether the user has created information for activating a search in a communication session. The communication session may include an interaction between the user and at least one other participant. The communication session may be established by a server. The messenger application includes a transmission unit for controlling the terminal to transmit, to the server, the information and a message input by the user. The messenger application includes a receiver unit for controlling the terminal to receive a search result. The received search result may be generated based on the message and the information. The messenger application includes a display unit for controlling the terminal to display the received search result on an area on which the transmitted and received message is displayed.

Example embodiments provide that the information is created by at least one of activating a search chat of the determined participant and recognizing a motion of the determined participant.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

FIG. 7 illustrates an example of a speech balloon providing a selected answer according to an example embodiment.

FIG. 8 is a flowchart illustrating a messenger service routine according to an example embodiment.

FIG. 9 is a flowchart illustrating a messenger service routine according to an example embodiment.

DETAILED DESCRIPTION OF EXAMPLE EMBODIMENTS

Figure 1:
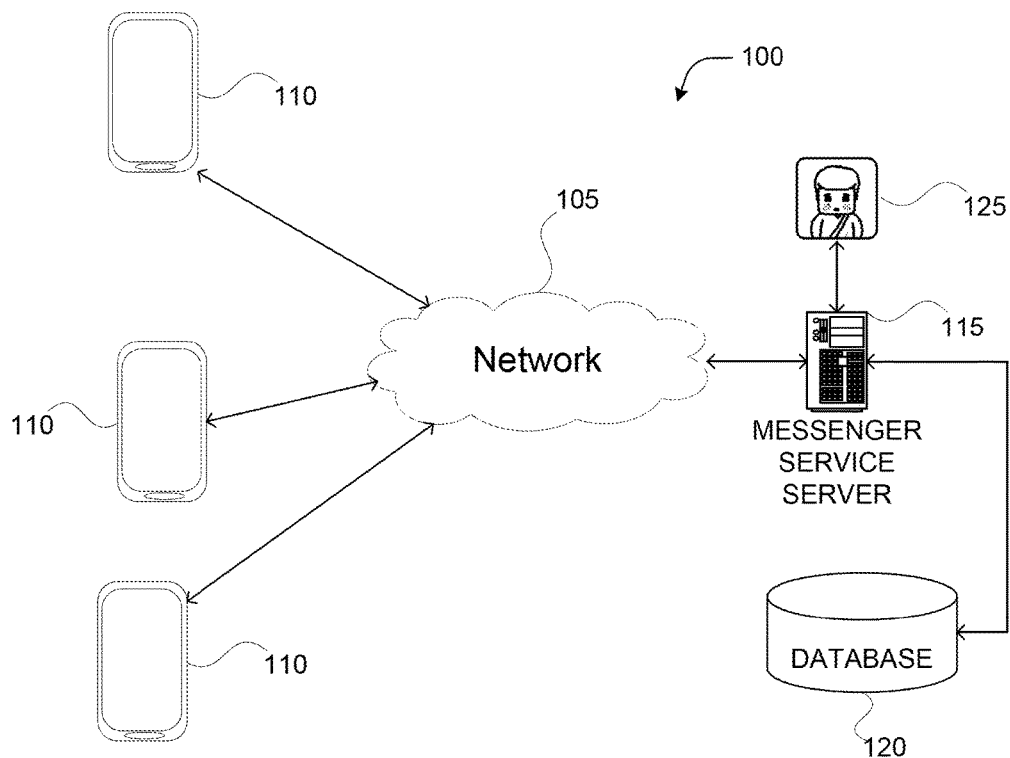
FIG. 1 illustrates an example of a communications network according to an example embodiment.

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sessions, these elements, components, areas, layers and/or sessions should not be limited by these terms. These terms are only used to distinguish one element, component, area, layer or session from another element, component, area, layer or session. Thus, a first element, component, area, layer or session discussed below could be termed a second element, component, area, layer or session without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sessional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

A messenger service and/or application according to example embodiments may further provide a chat service among at least one robot and at least two users (hereinafter, a multi-user chat service) in addition to existing services for a chat between users and a one-to-one chat between a desired (or alternatively, predetermined) robot and a user. A robot may be a computer program designed to simulate a conversation with one or more human users via auditory or textual methods. A robot may also be referred to as a chat robot, chatter robot, chatterbot, chatbot or chat bot, Artificial Conversational Entities (ACEs), talk bots, and/or chatterboxes. In various embodiments, a robot may be used for engaging in a conversation with a human user, such that the human user is misled or otherwise convinced that the robot's output has been produced by another human. Such robots may be used for casual conversations, psychoanalysis, automated technical/online support systems, and/or other like applications.

For example, a user may add a robot as a participant of a chat room while proceeding with a chat with another user in the chat room. As another example, a user may also invite another user to a chat room while proceeding with a chat with a robot in the chat room.

In the multi-user chat service, a chat may be classified into a general chat and a search chat. The general chat may include a message transferred between users, and the search chat may include a message between a user and a robot that may or may not be a target. For example, in a chat room in which a first user, a second user, and a robot are provided as participants, a search chat message input from the first user may be transferred only to the robot and an answer message of the robot may be transferred only to the first user. That is, messages transferred through the search chat may be displayed only on a terminal of the first user, and thus, be provided only to the first user, and may not be displayed on a terminal of the second user. The answer message of the robot may include at least a portion of a search result that is obtained by using the search chat message as a keyword.

Here, at least one of the following three methods (1), (2), and (3) may be employed as a method of applying a search chat.

(1) A physical application method is a method in which a user sets whether to activate a search chat through a user interface provided from a messenger application. For example, a user interface, such as a search chat button, may be displayed on an upper end or a lower end of a chat window, and a chat writing of the user may be classified into the search chat or a general chat based on a setting of the user through the user interface. For example, in a case in which the search chat button is provided from a smartphone, when the user touches the search chat button once, the search chat may be activated and the chat writing of the user may be recognized as the search chat. When the user touches the search chat button once more, activation of the search chat may be cancelled and the chat writing of the user may be recognized as the general chat.

(2) An application method using a short marking is a method in which a chat writing of a user is classified into a search chat and a general chat based on whether a desired (or alternatively, predetermined) marking (e.g., a first character of the chat writing marked as "?"), may be included in the chat writing of the user. For example, when the chat writing of the user starts with "?", the corresponding chat writing may be recognized as the search chat. As an example, a string "Chuseok gift" may be recognized as a general chat and a string "?Chuseok gift" may be recognized as a search chat. As another example, even if a user uses a voice chat method that is a method of changing an input voice to a text and displaying the text on a chat window as a chat writing, a desired (or alternatively, predetermined) marking may be input using the voice. For example, when the user speaks "question mark Chuseok gift", the speech corresponding to "question mark" may be recognized as the desired marking and the chat writing "?Chuseok gift" may be displayed on the chat window. The chat window may include a user interface of enabling the user to input a chat.

(3) An application method using a motion is a method of activating a search chat by detecting a desired (or alternatively, predetermined) motion of a user. As an example, in an example embodiment where a motion of the user inputting a chat writing to a chat window is detected, and then a desired (or alternatively, predetermined) area on which the input chat writing is displayed is pushed during a desired (or alternatively, predetermined) period of time (e.g., two to three seconds and the like), the corresponding chat writing may be recognized as the search chat. As another example embodiment, when a motion is detected where the user double touches or taps an area on which a corresponding chat writing is displayed or flicking the area in a desired (or alternatively, predetermined) direction, the corresponding chat writing may be recognized as the search chat. Depending on necessity and/or preference, various motions may be applied for activation of the search chat.

FIG. 1 illustrates an example of a communications network, according to an example embodiment. A communications network 100 includes mobile terminals 110, messenger service server 115, database 120, robot 125, and network 105.

According to various embodiments, mobile terminals 110 may be a hardware computing device capable of communicating with a server (e.g., messenger service server 115), such that each of the mobile terminals 110 are able to receive services from the server. Mobile terminals 110 may include memory, one or more processors, and transceiver. Mobile terminals 110 may be configured to send/receive data to/from network devices, such as a router, switch, or other like network devices, via a wired or wireless connection. Mobile terminals 110 may be designed to sequentially and automatically carry out a sequence of arithmetic or logical operations; equipped to record/store digital data on a machine readable medium; and transmit and receive digital data via one or more network devices. Mobile terminals 110 may include devices such as desktop computers, laptop computers, cellular phones, tablet personal computers, and/or any other physical or logical device capable of recording, storing, and/or transferring digital data via a connection to a network device. Mobile terminals 110 may include a wireless transceiver configured to operate in accordance with wireless communications standard.

According to various embodiments, messenger service server 115 may include a physical computer hardware system that is configured to provide services for client devices (e.g., mobile terminals 110) connected to a network (e.g., network 105). Messenger service server 115 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Messenger service server 115 may be configured to establish, manage, and terminate communications sessions, for example between the messenger service server 115 and one or more of the mobile terminals 110. Messenger service server 115 may also be configured to establish, manage, and terminate communications sessions two or more client devices.

According to various embodiments, messenger service server 115 is connected to one or more local and/or remote databases 120. In various embodiments, database 120 may include a database management system ("DBMS"). Database 120 may include a relational database management system ("RDBMS") database. In other embodiments, alternate DBMS may also be used, such as an object database ("ODBMS"), column-oriented DBMS, correlation database DBMS, and the like.

In various embodiments, robot 125 may be a program and/or service provided by, or otherwise associated with, messenger service server 115. Robot 125 may be a computer program designed to simulate a conversation with one or more human users via auditory or textual methods. Robot 125 may be used for engaging in a conversation with a human user, such that the human user is misled or otherwise convinced that the robot's output has been produced by another human. Robot 125 may be implemented by messenger service server 115, or a separate computing device that is able to communicate with messenger service server 115.

In various embodiments, network 105 may be the Internet. In other embodiments, network 105 may be may be a Wide Area Network (WAN) or other like network that covers a broad area, such as a personal area network (PAN), local area network (LAN), campus area network (CAN), metropolitan area network (MAN), a virtual local area network, or other like networks capable of physically or logically connecting computers.

As shown in FIG. 1, three mobile terminals 110, a single messenger service server 115, and a single database 120 are present. According to various embodiments, any number of client devices (e.g., mobile terminals 110), multiple servers (e.g., messenger service server 115), and/or multiple databases (e.g., database 120) may be present. Additionally, in some embodiments, messenger service server 115 and database 120 may be virtual machines, and/or they may be provided as part of a cloud computing service.

Figure 2:
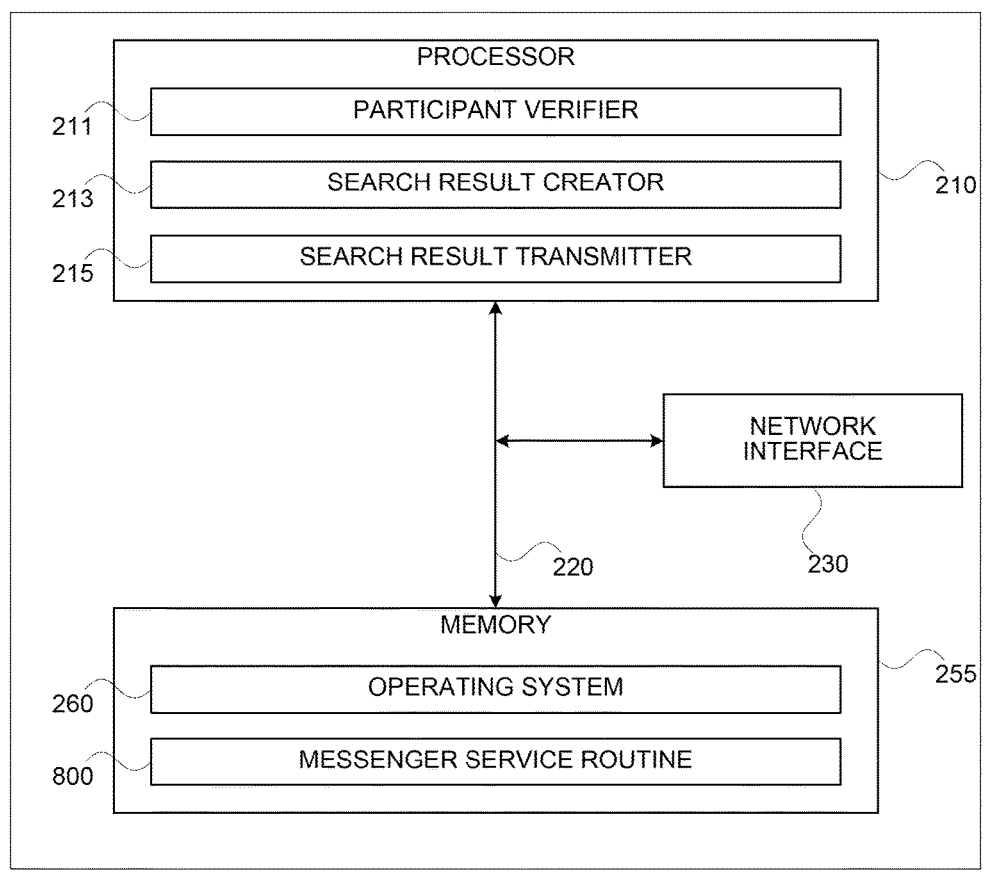
FIG. 2 illustrates the components of a network element being employed by a communication network according to an example embodiment.

FIG. 2 illustrates the components of messenger service server 115, according to an example embodiment. As shown, messenger service server 115 includes central processing 210, bus 220, network interface 230, and memory 255. During operation, memory 255 includes operating system 260 and messenger service routine 800; and processor 210 includes participant verifier 210, search result creator 213, and search result transmitter 215. In some embodiments, messenger service server 115 may include many more components than those shown in FIG. 2. However, it is not necessary that all of these generally conventional components be shown in order to disclose the illustrative embodiment. For example, messenger service server 115 may also include a display, a transceiver, and/or other like components.

Memory 255 may be a computer readable storage medium that generally includes a random access memory (RAM), read only memory (ROM), and a permanent mass storage device, such as a disk drive. Memory 255 also stores operating system 260 and program code for messenger service routine 800. These software components may also be loaded from a separate computer readable storage medium into memory 255 using a drive mechanism (not shown). Such separate computer readable storage medium may include a floppy drive, disc, tape, DVD/CD-ROM drive, memory card, or other like computer readable storage medium (not shown). In some embodiments, software components may be loaded into memory 255 via network interface 230, rather than via a computer readable storage medium.

Processor 210 may be configured to carry out instructions of a computer program by performing the basic arithmetical, logical, and input/output operations of the system. Instructions may be provided to processor 210 by memory 255 via bus 220, or by network interface 230 via bus 220. Processor 210 is configured to execute program code for participant verifier 210, search result creator 213, and search result transmitter 215. Such program code may be stored in a storage device (e.g., memory 255).

Bus 220 enables the communication and data transfer between the components of messenger service server 115. Bus 220 may comprise a high-speed serial bus, parallel bus, storage area network (SAN), and/or other suitable communication technology.

Network interface 230 is a computer hardware component that connects messenger service server 115 to a computer network (e.g., network 105). Network interface 230 may connect messenger service server 115 to a computer network via a wired or wireless connection.

Figure 3:
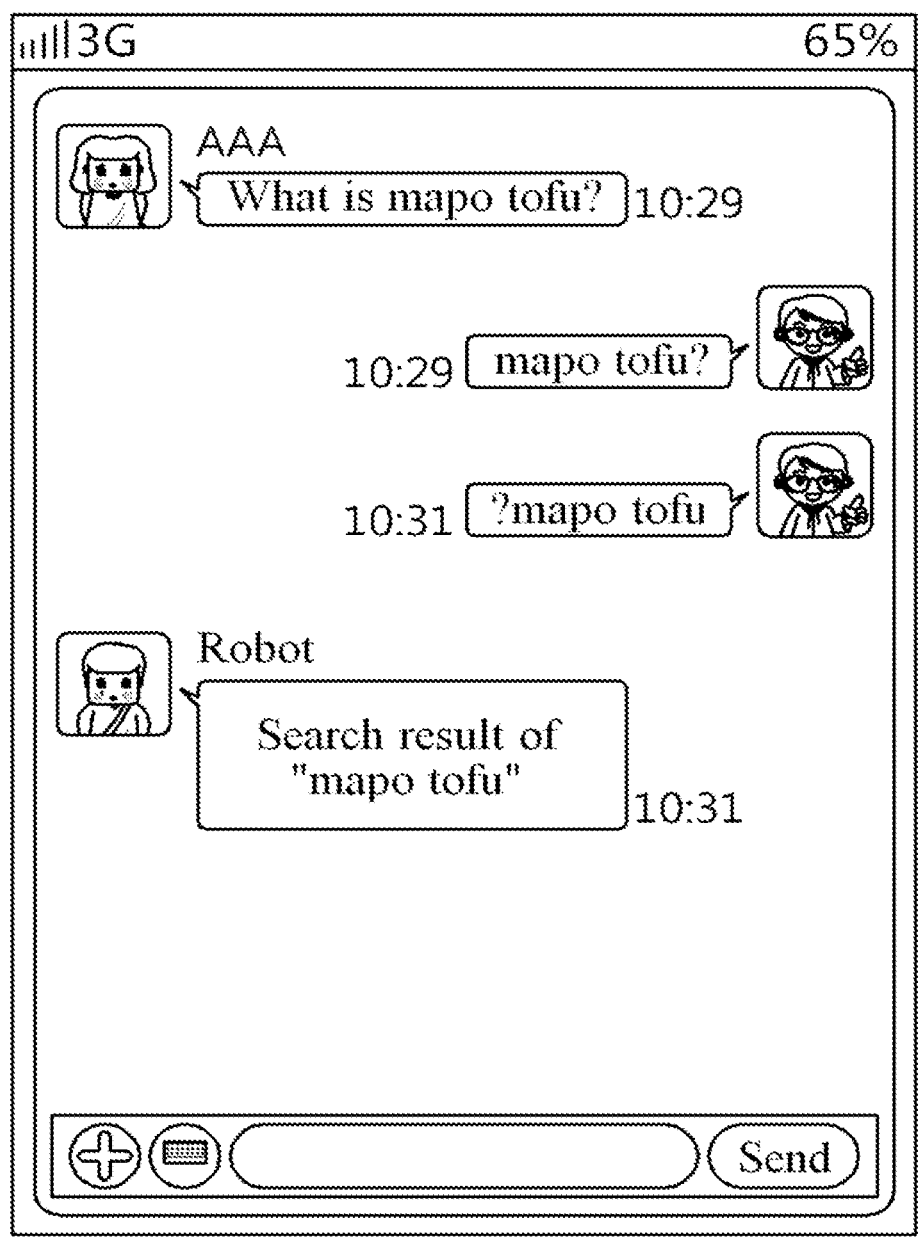
FIGS. 3 and 4 illustrate a screen of a chat room in a mobile environment according to an example embodiment.
Figure 4:
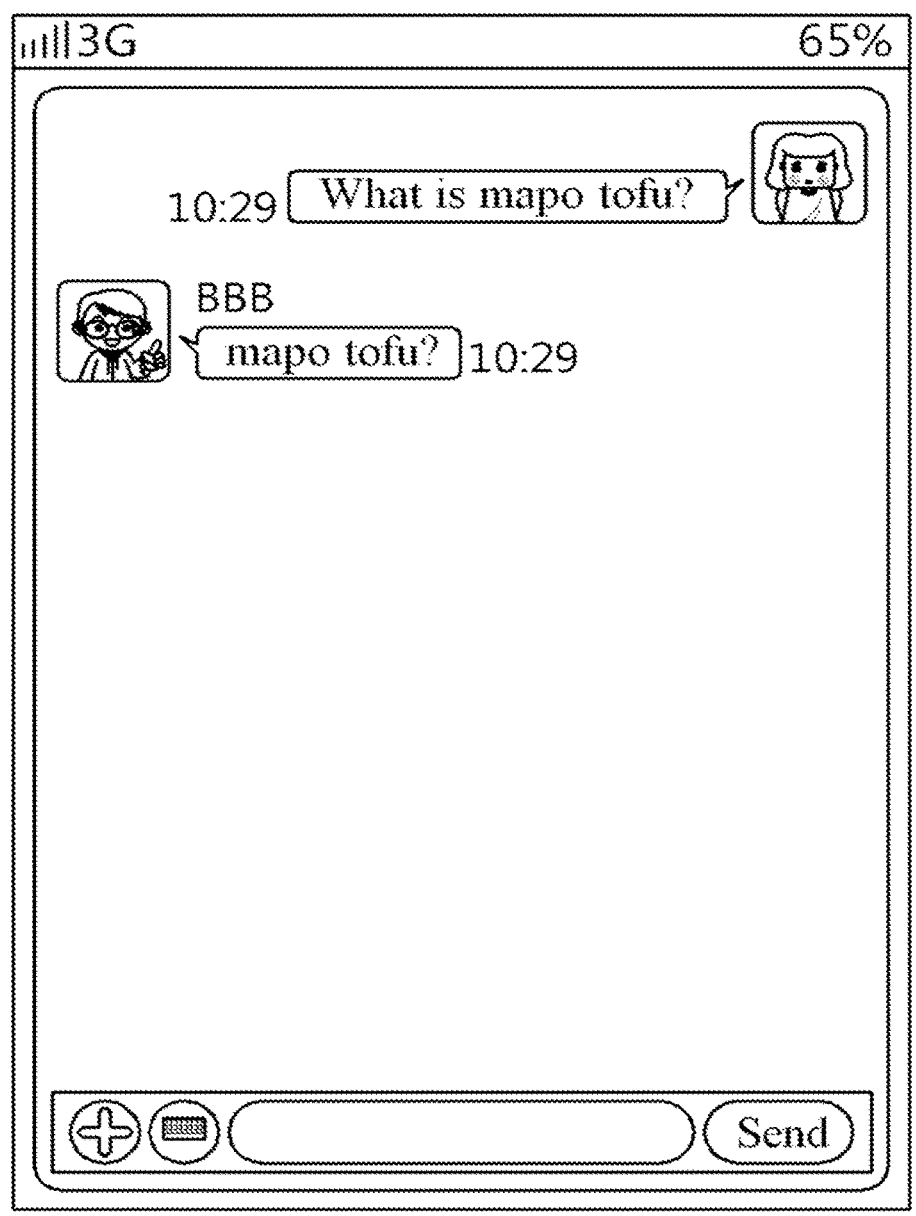

FIGS. 3 and 4 illustrate a screen of a chat room in a mobile environment according to an example embodiment. FIGS. 3 and 4 illustrate examples of a chat room in which a user "AAA", a user "BBB", and a robot that is a search service are provided as participants. FIG. 3 illustrates a terminal screen 300 of the user "BBB" and FIG. 4 illustrates a terminal screen 400 of the user "AAA". FIG. 3 illustrates an example in which a chat writing "?mapo tofu" of the user "BBB" is input as a search chat using (2) the aforementioned "application method using the short marking". Here, the robot may verify, obtain, or otherwise determine a keyword "mapo tofu" through the search chat "?mapo tofu" that is the chat writing of the user "BBB", and may provide a search result of the keyword "mapo tofu" to the user "BBB". An example of providing, by the robot, the search result of the keyword "mapo tofu" is displayed on the terminal screen 300 of the user "BBB". As described above, the search chat "?mapo tofu" and the search result of the robot may be transferred only between the user "BBB" and the robot. Accordingly, as illustrated in FIG. 4, the search chat "?mapo tofu" and the search result of the robot may not be displayed on the terminal screen 400 of the user "AAA".

Even though FIGS. 3 and 4 illustrate the terminal screens 300 and 400 of the chat room in which the user "AAA", the user "BBB", and the robot are provided as participants, the robot may be added to the chat room using an "invite" if one or more of users so desire.

Example embodiments of providing the search result of the keyword "mapo tofu" are described with reference to FIG. 3. However, compared to a PC environment in which a PC is used, it may be inconvenient to use an input/output (I/O) interface in a mobile environment. Due to such characteristic, a keyword used in the mobile environment is highly likely to have a length shorter than a keyword used in the PC environment. In addition, a user desires to view the search result in a further briefly arranged style. Therefore, according to example embodiments, it is possible to provide a search implementation method differentiated from the PC environment, so as to be more suitable for a user in the mobile environment.

Figure 5:
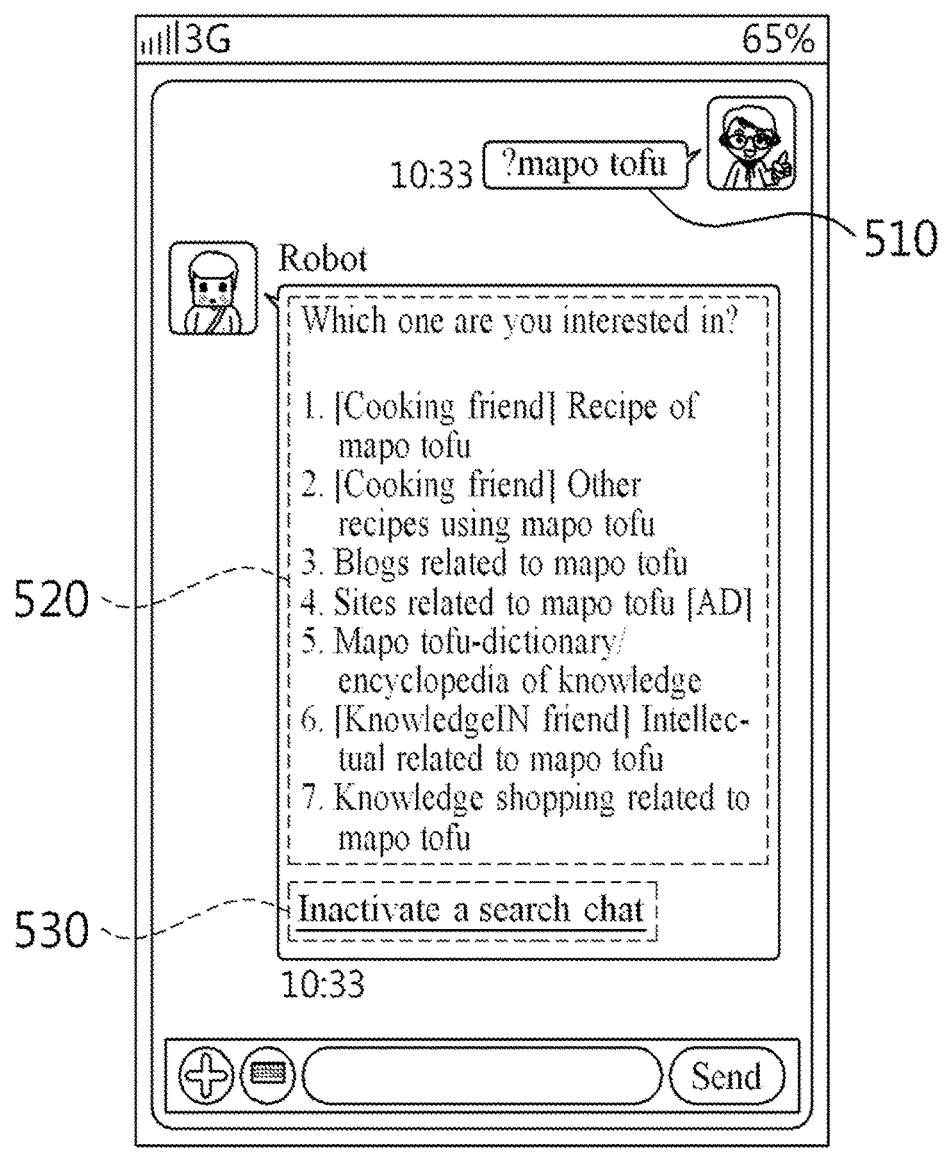
FIG. 5 illustrates an example of a screen of a chat room providing a question list according to an example embodiment.

FIG. 5 illustrates an example of a screen 500 of a chat room providing a question list according to example embodiments. Referring to the screen 500, a user "AAA", a user "BBB", and a robot that is a search service are provided as participants in the chat room. In this example, in response to the user "BBB" inputting a search chat "?mapo tofu" 510, the robot may provide a question list corresponding to the search chat "?mapo tofu" 510. A first box 520 illustrates an example of the question list displayed on the screen 500 of the chat room.

Here, the question list may include questions having a relatively high correlation among questions created by redefining a query, that is, a question of the user "BBB" based on a keyword "mapo tofu" included in the search chat "?mapo tofu" 510. Questions included in the question list may be created by redefining questions for each category based on the keyword "mapo tofu". In various embodiments, redefining a question may include joining or otherwise combining separate questions and/or queries. For example, a question and/or query for a cooking/kitchen database may include "Recipe of *" and a question and/or query for a search advertisement database may include "Sites related to * [AD]". Accordingly, a redefined question, such as "sites related to mapo tofu [AD]" may be created by combining the question "Sites related to * [AD]" with the keyword "mapo tofu" and a redefined question "Recipe of mapo tofu" may be created by combining the question "Recipe of *" and the keyword "mapo tofu".

In various embodiments, the robot may use various types of databases, such as a cooking/kitchen database, a weather database, a fortune database, a calculator functioning database, a dictionary database, a blog/café database, a search advertisement database, and/or a service database configured in a question-and-answer form. The robot may create questions by redefining the questions for each database.

"Inactivate a search chat" included in a second box 530 may refer to a user interface including a function of terminating the search chat and switching to a general chat. According to an increase in contents of the search chat, to verify a general chat with another user, for example, the user "AAA", may become relatively difficult and thus, there may be a need and/or desire to arrange the screen 500 of the chat room after terminating the search chat. For example, in a case in which the user "BBB touches an area on which the user interface "inactivate a search chat" is displayed in FIG. 5, a chat writing (e.g., "?mapo tofu" of the user "BBB" and a chat writing of the robot, and/or a chat writing including a question list and a user interface), which have initiated the search chat, may be deleted from the screen 500 of the chat room. The user interface "inactivate a search chat" will be further described below.

Figure 6:
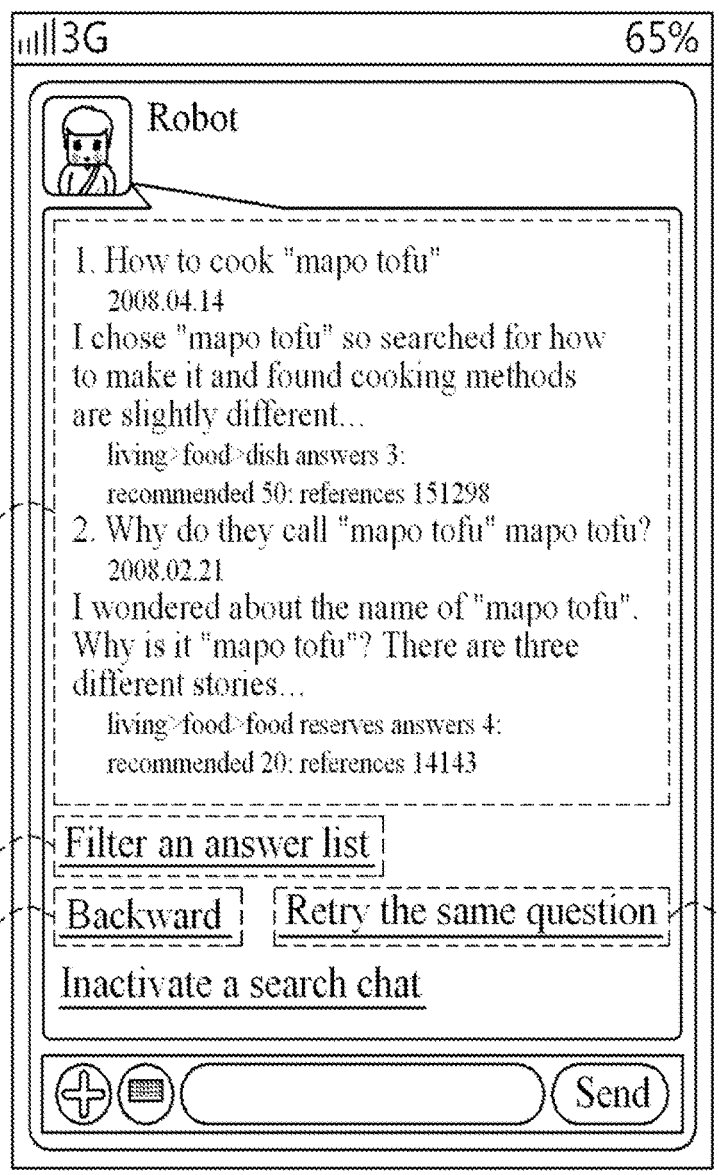
FIG. 6 illustrates an example of a screen of a chat room providing an answer list according to an example embodiment.

FIG. 6 illustrates an example of a screen 600 of a chat room providing an answer list according to example embodiments. In response to the user "BBB" inputting a number of a desired question or touching a link thereto on the question list of FIG. 5, an answer list included in a first box 610 may be displayed on the screen 600 of the chat room. In various embodiments, at least a desired (or alternatively, predetermined) data amount of search results or at least a desired (or alternatively, predetermined) number of search results are provided through the answer list, only the desired data amount of search results or the desired number of search results may be displayed on the screen 600 of the chat room. An additional search result may also be provided through a link to a corresponding database using a function, such as "more view".

"Filter an answer list" included in a second box 620 may refer to a user interface including a function of limiting a target capable of giving an answer in the case of using a service database configured in a query and/or question-and-answer form. For example, a filtering function for receiving, as a search result, an answer from only an expert of at least a desired (or alternatively, predetermined) class (e.g., a doctor, a lawyer, a certified labor attorney, and/or other like experts), and a filtering function for receiving, as a search result, an answer from only an answerer of at least a desired class among classes into which answerers are classified in a service configured in a question-and-answer form may be provided through the user interface "filter an answer list".

"Backward" included in a third box 630 may refer to a user interface including a function of returning to a step before a current selection.

According to example embodiments, a speech balloon including an answer list may be provided by changing a speech balloon of the robot of FIG. 5, including the question list, with a speech balloon of the robot of FIG. 6. In this example, the question list of FIG. 5 disappears, and thus, the user may have difficulty in selecting another question from the question list. Accordingly, the user may be provided with the question list of FIG. 5 again through the user interface "backward".

According to other example embodiments, a speech balloon including an answer list may be provided separate from the speech balloon of the robot of FIG. 5. In this example, if contents of the answer list increases, the speech balloon of the robot of FIG. 5 may be off the screen 300. Accordingly, to select another question from the question list, the user may need to control the speech balloon of the robot of FIG. 5 to be displayed again on the screen 300 through a motion, such as flicking and/or other like motions. In this case, the user interface "backward" may include a function of automatically adjusting displaying of a screen so as to display a previous speech balloon on a screen.

"Retry the same question" included in a fourth box 640 may refer to a user interface including a function of returning from a current search process, for example, a search process in response to an input of the search chat "?mapo tofu", to a question list corresponding to a first step. For example, when various search results are verified, obtained, or otherwise determined by repeating an operation of verifying a search result, the user may return to an original question list through the user interface "retry the same question". In this example, contents of a speech balloon may be modified, a screen may be adjusted to be located at a corresponding portion, or a question list corresponding to the first step may be displayed again, which is the same as the user interface "backward".

In various embodiments, the user interface "inactivate a search chat" described above with reference to FIG. 5 may include a function of deleting all of the speech balloons associated with a search result provided in a corresponding search session. In embodiments where an individual speech balloon is sequentially displayed below a previous speech balloon instead of changing a speech balloon when moving to the next step of a search, search results corresponding to a process from a first step of a corresponding search session to a step in which a deleting function is used may be deleted. That is, when performing a search up to a final step of FIG. 7 and selecting the user interface "inactivate a search chat" of the step of FIG. 6, speech balloons provided during a process from the first step up to the step of FIG. 6 may be deleted and search results of FIG. 7 may not be deleted. Deleting of speech balloons may be applied separate from speech balloons associated with a search result provided in another search session. Here, speech balloons associated with the search result shared with the other user may not be deleted. Sharing of the search result will be further described below.

FIG. 7 illustrates an example of a speech balloon 700 providing a selected answer according to example embodiments. Referring to FIG. 7, for ease of description, a screen of a chat room is omitted and only the speech balloon 700 providing an answer selected by a user is provided. In addition, "(content)" within the speech balloon 700 indicates that content of the answer is omitted for easy illustration in the drawing.

A user interface "more view on a chat window" may include a function of providing the omitted content through the speech balloon 700 or an additional speech balloon in a case in which the user desires to view content omitted in the speech balloon 700.

A user interface "connect to a web" may include a function of verifying the content omitted in the speech balloon 700 using a separate window. For example, in response to a touch on a recognition area of the user interface "connect to a web", a selected answer may be provided through a popup window using a link to a corresponding web database.

A user interface "share a current search result" may include a function of sharing a provided answer with other users of a chat room, a desired (or alternatively, predetermined) user of the chat room, or another user who is absent in the chat room. For example, even though the search result is not provided to the user "AAA" in FIG. 4, the speech balloon 700 may be controlled to be displayed for the user "AAA" using the user interface "share a current search result".

As described above, the user interface "inactive a search chat" may include a function of deleting all of the speech balloons associated with the provided search result in a corresponding search session. As described above, the search result shared with another user may be excluded from a target to be deleted.

Also, even though the robot is described as a participant that is invited and then added in the above example embodiments, the search chat may be configured to be immediately activated using at least one of the aforementioned three methods (1), (2) and (3) without a need to separately add or invite the robot. For example, in the case of activating the search chat using one of the aforementioned methods (1), (2), and (3) while a user is chatting with another user based on one-to-one, a messenger service may be provided in the same manner as a case in which the robot is automatically added. For example, FIG. 3 may illustrate a case in which the robot is automatically invited in response to the search chat "?mapo tofu" while the user "AAA" and the user "BBB" are having a one-to-one chat.

In various embodiments, an advertisement (e.g., a search advertisement) may be included in the search result of the example embodiments. Accordingly, a service provider may induce advertising sales according to providing of the advertisement.

In various embodiments, a messenger service may be provided to a terminal of a user by communicating with a server according to a control of a messenger application installed in the terminal of the user. The messenger application may be provided from the server and thereby be installed in the terminal of the user, or may be provided through a separate messenger application distribution system and thereby be installed in the terminal of the user. The messenger application distribution system may include a filer providing unit (not shown) configured to provide a file for installing the messenger application in the terminal of the user.

FIG. 8 is a flowchart illustrating a messenger service routine 800 according to an example embodiment. The messenger service routine 800 may be performed by messenger service server 115. Thus, the operations of the messenger service routine 800 are described as being performed by the components of the messenger service server 115. It should be noted that, in various other embodiments, the messenger service routine 800 may be performed by any server and/or other like network device.

In operation 810, the messenger service server 115 or the participant verifier 211 verifies or otherwise determines a participant transmitting desired (or alternatively, predetermined) information for activating a search in a communication session in which messages are transferred between participants. For example, the communication session may be a session set between participants of a chat room until the chat room is opened and then closed.

As an example, the desired information may be created through a setting for activating a search chat of the verified and/or determined participant. In this example, verifying and/or determining the participant transmitting the desired information may correspond to verifying and/or determining the participant using the physical application method (1), as described above.

As another example, the desired information may include a desired marking that is included in a message transmitted from the verified and/or determined participant. In this example, verifying the participant transmitting the desired information may correspond to verifying the participant using the application method using the short marking (2), as described above.

As still another example, the desired information may be created by recognizing a motion of the verified and/or determined participant. In this example, verifying and/or determining the participant transmitting the desired information may correspond to verifying the participant using the application method using the motion (3), as described above.

In operation 820, the messenger service server 115 or the search result creator 213 creates a search result using the message transmitted from the verified and/or determined participant together with the desired information.

As an example, the search result may include a result retrieved by using, as a keyword, at least a portion of a text included in the message. For example, where the participant activates a search through a setting for activating a search chat, a terminal of the participant may transmit the desired information and a message when the participant inputs and transmits the message. Here, the messenger service server 115 or the search result creator 213 may create the search result by using, as a keyword, the message received together with the desired information.

As another example, the search result may include a question list including a plurality of questions created by using, as a keyword, at least a portion of a text included in the message and by redefining the keyword.

In various embodiments, the plurality of questions may be created for each of a plurality of search databases. In this example, the question list may include a link to an answer list providing a search result from each of the plurality of search databases.

In various embodiments, the answer list may include a link to an individual search result. The individual search result may include a single document or content included in the single document.

The question list, the answer list, and the individual search result are described above, and thus, a repeated description related thereto will be omitted.

In operation 830, the messenger service server 115 or the search result creator 215 transmits the created search result to the verified and/or determined participant. Here, the search result may be displayed on the terminal of the participant. A method of displaying the search result on a terminal of a user is described above, and thus, a repeated description related thereto will be omitted.

In various embodiments, the search result may include a search advertisement retrieved by using, as a keyword, at least a portion of the text included in the message. For example, a search advertisement may be provided as the search result together with other web documents.

At least one of participants may include a bot participant configured to perform a role of a participant in a server. In this example, the message transmitted together with the desired information may be transferred to the robot participant. The message may be classified into one of a general chat and a search chat by the robot participant based on the desired information. In an example in which the message is classified into the search chat, the messenger service server 115 or the search result creator 213 may create the search result through the bot participant in operation 820.

The robot participant may correspond to the aforementioned robot, and may create the search result using a variety of databases. In various embodiments, a plurality of robot participants may be present, and each of the plurality of robot participants may correspond to one or more individual databases, respectively.

FIG. 9 is a flowchart illustrating a messenger service routine 900 according to another example embodiment. The messenger service routine 900 according to the present example embodiments may be performed by a mobile terminal 110 or other like computing device (e.g., a client device).

In operation 910, the mobile terminal 110 may verify or otherwise determine whether the user creates predetermined and/or desired information for activating a search in a communication session in which a message is transmitted and received between the user and at least one participant through a server. In various embodiments, the desired information may correspond to the desired information described above with reference to at least FIGS. 2 and 8. The communication session may be a session set in association with a chat room that is opened between the user and the at least one participation. Here, the server may correspond to the messenger service server 115 as described above with reference to at least FIGS. 2 and 8.

The at least one participant may include a robot participant provided from the server and/or an other like network device, which is configured to perform a role of a participant. In this example, the message transmitted to the server together with the desired information may be transmitted to the robot participant. The message may be classified into one of a general chat and a search chat by the robot participant based on the desired information. In an example embodiment in which the message is classified into the search chat, the search result may be created and provided via the robot participant. As described above, the robot participant may correspond to the aforementioned "robot" and may create the search result using a variety of databases. Here, a plurality of robot participants may be present, and the plurality of robot participants may correspond to one or more individual databases, respectively.

In operation 920, the mobile terminal 110 transmits, to the server, the desired information and a message input or otherwise generated by the user. For example, in a case in which the user activates a search through a setting for activating a search chat, the desired information may be created when the user creates a message. In various embodiments, the created predetermined and/or desired information may be transmitted to the server together with a corresponding message.

In operation 930, the mobile terminal 110 receives a search result that is created using the message input from the user based on the desired information. The search result may be created, generated, or otherwise provided by the server. Such search result is described above, and thus, a repeated description related thereto will be omitted.

In operation 940, the mobile terminal 110 displays the received search result on an area on which the transmitted and received message is displayed. The displayed search result may be, for example, a question list, and an answer list or an individual search result may be provided in response to the question list.

Even though not illustrated, a messenger service method according to other example embodiments may further include at least one of an operation of providing a function of sharing the search result and at least one individual search result provided through the search result with at least one participant of the communication session. In various embodiments, the messenger service method may also optionally include an operation of providing a function of deleting the search result and a search result displayed in a desired (or alternatively, predetermined) search session in response to creation of the desired information. In various embodiments, the messenger service method may also optionally include an operation of providing a function of filtering search results, obtained from an expert or an answerer of at least a desired class, from search results that are extracted using a database of a service configured in a question-and-answer form. The function of sharing the individual search result with other participants, the function of providing the displayed search result, or the function of filtering the search result is described above, and thus, a repeated description related thereto will be omitted.

The aforementioned messenger application may include modules configured to control the mobile terminal 110 to perform the operations of the messenger service method described with reference to FIG. 9.

The omitted description of FIG. 8 may refer to the description made above with reference to FIGS. 1 through 7. The omitted description of FIG. 9 may refer to the description made above with reference to FIGS. 1 through 8.

As described above, and according to example embodiments, a messenger service is provided that enables a chat among at least one robot and at least two users (hereinafter, a multi-user chat). In various embodiments, one or more advertisements may be provided in the search result through at least one robot and providing an advertisement through the search result during a multi-user chat. In such embodiments, advertising sales may be improved by providing the advertisements with the search results.

According to example embodiments, it is possible to enable a user to select a robot from among a plurality of robots based on one or more databases associated with each of the plurality of robots. In such embodiments, the user may select a robot based on a database type of the one or more databases associated with each of the plurality of robots. The user may be able to select an individual robot and make an inquiry within a current chat window and thereby overcome an inconvenience of a user having to leave a current chat window and then select an individual robot and to enable the user to more conveniently make an inquiry within the current chat window. Accordingly, it is possible to provide a search result to be suitable for a messenger user in a mobile environment.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A messenger service method, comprising:
   determining, by a processor, that a user has created information for activating a search communication which provides the user with a search result for at least a part of a message input by the user in a chat room in which the user is a participant with at least one other participant, the search communication being between the user and a search conversational program, the at least one other participant being separate from the search conversational program;
   transmitting, by the processor to a server associated with the search conversational program, the information and said at least part of the message;
   receiving, by the processor, the search result created by the server associated with the search conversational program, the received search result being generated based on the message and the information, the search result including information associated with a document, the document being retrieved using a keyword, the keyword including at least a portion of a text included in the message;
   sharing the received search result with the at least one other participant in response to receiving a first selection from the user;
   outputting the search result together with a user interface to a display, the user interface being is configured to enable the user to acquire an additional information on the information associated with the document, the search result and the user interface presented to the user and not presented to the at least one other participant; and
   deleting the output search result from the display in response to receiving a second selection from the user, wherein the output search result is deleted from the display only when the output search result is not shared with the at least one other participant.

2. The method of claim 1, further comprising:
   displaying the received search result in an area corresponding to an area where the message is displayed.

3. The method of claim 1, wherein the at least one other participant includes a robot participant for simulating a human participant, and the transmitting comprises:
   transmitting the information and the message to the robot participant.

4. The method of claim 3, wherein the message is classified as one of a general chat message and a search chat message, and the robot participant determines the classification based on the information.

5. The method of claim 4, wherein, when the message is classified as the search chat, the search result is created by the robot participant and the robot participant provides the search result to the user.

6. The method of claim 1, wherein the information includes a marking, the marking being obtained from the message.

7. The method of claim 1, wherein the information is created by at least one of an activation of a search chat and recognizing a motion.

8. The method of claim 7, wherein the motion is recognized in response to a user generated event, the user generated event being an interaction with a display area of an input window.

9. The method of claim 8, wherein the user generated event is generated by recognizing at least one of a contact, a double-touch, and a flicking occurring on the display area of the input window during a desired amount of time.

10. The method of claim 1, further comprising:
    filtering the received search results by separating search results obtained from at least one expert of a desired class from search results obtained from a database.

11. A non-transitory computer-readable recording medium comprising program code that, when executed by a processor, implements the method of claim 1.

12. A messenger service method, comprising:
    determining, by a server, that a participant of a chat room has transmitted information for activating a search communication with a search conversational program associated with the server, such that the search conversational program joins the chat room and provides the participant with a search result for at least a part of at least one message transmitted from the participant in the chat room, the chat room including,
       the determined participant and at least one other participant, the at least one other participant being separate from the search conversational program, and
       at least one other message that is transferred between the determined participant and the at least one other participant;
    creating, by the server, the search result based on said at least part of the message transmitted from the determined participant and the information, wherein the search result includes information associated with a document, the document being retrieved using a keyword, the keyword including at least a portion of a text included in the message;
    transmitting, by the server, the created search result to the determined participant; and
    sharing the created search result with the at least one other participant in response to receiving a first selection from the determined participant,
    wherein,
       the search result is output together with a user interface to a display, the user interface being configured to enable the participant to acquire an additional information on the information associated with the document, the search result and the user interface presented to the determined participant and not presented to the at least one other participant, and
       the output search result is deleted from the display in response to receiving a second selection from the user, the output search result being deleted only when the output search result is not shared with the at least one other participant.

13. The method of claim 12, wherein the at least one other participant includes a robot participant, the robot participant simulating a human participant, and the transmitting comprises:
    transferring the message and the information to the robot participant.

14. The method of claim 13, wherein the message is classified as one of a general chat and a search chat, the classification being based on the information, and the creating comprises:
    creating the search result through the robot participant when the message is classified into the search result.

15. The method of claim 12, wherein the information includes a marking, the marking being obtained from the message.

16. The method of claim 12, wherein the information is created by at least one of activating a search chat by the determined participant and recognizing a motion of the determined participant.

17. The method of claim 12, wherein the search result includes
an advertisement, the advertisement being retrieved using the keyword.

18. The method of claim 12, wherein,
the search result includes a question list including a plurality of questions, the question list being created using the keyword and a redefinition of the keyword,
the plurality of questions is created for each one of a plurality of search databases, and
the question list includes a link to an answer list, and the answer list includes a list of at least one search result from each one of the plurality of search databases.

19. The method of claim 18, wherein the answer list includes a link to a document corresponding to the at least one search result.

20. A messenger service server, comprising:
a processor configured to execute,
a participant verifier for determining that a participant of a chat room has transmitted information for activating a search communication with a search conversational program in the chat room, such that the search conversational program joins the chat room and provides the participant with a search result for at least a part of a message input by the participant in the chat room, the chat room including,
the determined participant and at least one other participant, the at least one other participant being separate from the search conversational program, and
at least one message that is transferred between the determined participant and the at least one other participant,
a search result creator for creating the search result associated with the search conversational program based on said at least the part of the message transmitted from the determined participant and the information, wherein the search result includes information associated with a document, the document being retrieved using a keyword, the keyword including at least a portion of a text included in the message, and
a search result transmitter for
transmitting the created search result to the determined participant, and
sharing the created search result with the at least one other participant in response to receiving a first selection from the determined participant,
wherein,
the search result is output together with a user interface to a display, the user interface being configured to enable the participant to acquire an additional information on the information associated with the document, the search result and the user interface presented to the determined participant and not presented to the at least one other participant, and
the output search result is deleted from the display in response to receiving a second selection from the user, the output search result being deleted only when the output search result is not shared with the at least one other participant.

21. The server of claim 20, wherein the information is created by at least one of activating a search chat of the determined participant and recognizing a motion of the determined participant.

22. A system for distributing a messenger application, the system comprising:
a processor configured to execute a file providing module for providing a file to a terminal, the file being used for installing the messenger application on the terminal,
the messenger application includes,
a verification unit for controlling the terminal to determine that a user associated with the terminal has created information for activating a search communication with a search conversational program in a chat room in which the user is a participant, such that the search conversational program joins the chat room and provides the user with a search result for at least a part of a message input by the user in the chat room in which the user is a participant, the chat room including an interaction between the user and at least one other participant, the at least one other participant being separate from the search conversational program, the chat room being established by a server associated with the search conversational program,
a transmission unit for controlling the terminal to transmit, to the server, the information and the message input by the user,
a receiver unit for controlling the terminal to receive the search result, the received search result being generated by the server associated with the search conversational program based on said at least the part of the message and the information, the search result including information associated with a document, the document being retrieved using a keyword, the keyword including at least a portion of a text included in the message,
a display unit for outputting the received search result together with a user interface to a display, the user interface being configured to enable the user to acquire an additional information on the information associated with the document, the search result and the user interface presented to the user and not presented to the at least one other participant, and
computer-readable instructions that, when executed by one or more processors of the terminal, cause the terminal to,
share the received search result with the at least one other participant in response to receiving a first selection from the user, and
delete the output search result from the display in response to receiving a second selection from the user, the output search result being deleted from the display only when the output search result is not shared with the at least one other participant.

23. The system of claim 22, the information is created by at least one of activating a search chat of the user and recognizing a motion of the user.

* * * * *